United States Patent
Linzer (10) Patent No.: US 7,170,934 B2
(45) Date of Patent: Jan. 30, 2007

(54) METHOD AND/OR APPARATUS FOR MOTION ESTIMATION USING A HIERARCHICAL SEARCH FOLLOWED BY A COMPUTATION SPLIT FOR DIFFERENT BLOCK SIZES

(75) Inventor: Elliott N. Linzer, Suffern, NY (US)

(73) Assignee: LSI Logic Corporation, Milpitas, CA (US)

( * ) Notice: Subject to any disclaimer, the term of this patent is extended or adjusted under 35 U.S.C. 154(b) by 848 days.

(21) Appl. No.: 10/324,487

(22) Filed: Dec. 20, 2002

(65) Prior Publication Data

US 2004/0120400 A1 Jun. 24, 2004

(51) Int. Cl.
*H04B 1/66* (2006.01)
*H04N 7/12* (2006.01)
(52) U.S. Cl. .................................... 375/240
(58) Field of Classification Search ............. None
See application file for complete search history.

(56) References Cited

U.S. PATENT DOCUMENTS

| | | | |
|---|---|---|---|
| 5,576,767 A * | 11/1996 | Lee et al. ........... | 375/240.14 |
| 5,598,514 A | 1/1997 | Purcell et al. | |
| 5,604,540 A | 2/1997 | Howe | |
| 5,608,656 A | 3/1997 | Purcell et al. | |
| 5,737,023 A | 4/1998 | Linzer | |
| 5,761,398 A | 6/1998 | Legall | |
| 5,801,778 A | 9/1998 | Ju | |
| 5,905,542 A | 5/1999 | Linzer | |
| 6,108,039 A | 8/2000 | Linzer et al. | |
| 6,122,442 A | 9/2000 | Purcell et al. | |
| 6,130,912 A * | 10/2000 | Chang et al. ......... | 375/240.16 |
| 2003/0138150 A1 * | 7/2003 | Srinivasan .......... | 382/238 |

OTHER PUBLICATIONS

"Editor's Proposed Draft Text Modifications for Joint Video Specifications (ITU-T Rec. H264 / ISO/IEC 14496-10 AVC), Draft 7", Joint Video Team (JVT) of ISO/IEC MPEG and ITU-T VCEG, Oct. 2002, pp. 1-197.

* cited by examiner

*Primary Examiner*—Nhon Diep
(74) *Attorney, Agent, or Firm*—Christopher P. Maiorana, P.C.

(57) ABSTRACT

A method for performing motion estimation comprising the steps of (a) determining one or more first vectors representative of a displacement of a first block of a first image in a second image and (b) determining one or more second vectors representative of a displacement of the first block in the second image and a first sub-block and second sub-block of the first block based upon the one or more first vectors, a plurality of error scores, and a combination of the plurality of error scores.

22 Claims, 5 Drawing Sheets

METHOD AND/OR APPARATUS FOR MOTION ESTIMATION USING A HIERARCHICAL SEARCH FOLLOWED BY A COMPUTATION SPLIT FOR DIFFERENT BLOCK SIZES

FIELD OF THE INVENTION

The present invention relates to data compression generally and, more particularly, to a method and/or apparatus for implementing motion estimation using a hierarchical search followed by computation split for different block sizes.

BACKGROUND OF THE INVENTION

Compression of digital video data is needed for many applications. Transmission over limited bandwidth channels such as direct broadcast satellite (DBS) and storage on optical media (i.e., CD, DVD, etc.) are typical examples. In order to achieve efficient compression, complex, computationally intensive processes are used for encoding (or compressing) and decoding (or decompressing) digital video signals. For example, even though MPEG-2 is known as a very efficient method for compressing video, more efficient compression standards such as H.264 are being developed.

A challenge in conventional digital video data compression techniques involves efficient motion estimation searches for a compression technique that uses variable block sizes. Conventional solutions employ a full search. However, the conventional solutions are computationally intensive, slow, and need expensive hardware to run.

It would be desirable to provide an efficient motion estimation search method for a compression technique that uses variable block sizes that may be implemented without expensive hardware.

SUMMARY OF THE INVENTION

The present invention concerns a method for performing motion estimation comprising the steps of (a) determining one or more first vectors representative of a displacement of a first block of a first image in a second image and (b) determining one or more second vectors representative of a displacement of the first block in the second image and a first sub-block and second sub-block of the first block based upon the one or more first vectors, a plurality of error scores, and a combination of the plurality of error scores.

The objects, features and advantages of the present invention include providing a method and/or apparatus for motion estimation using a hierarchical search followed by a computation split for different block sizes that may (i) provide a method for choosing motion vectors with fewer computations than conventional approaches, (ii) be implemented with less hardware than conventional solutions, (iii) be implemented in a low power environment, (iv) provide improved image quality when compared with conventional approaches, (v) provide a better search range when compared with conventional approaches, and/or (vi) provide real time processing.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide a motion estimation technique for compression/decompression systems that may run faster, allow smaller hardware implementations, reduce power consumption and/or provide better image quality than conventional solutions (e.g., provide greater search range). In a first stage of the motion estimation process a coarse motion estimation search may be performed. The result of the coarse estimation may be used as a starting vector for at least two blocks that partially overlap (e.g., one block may be a sub-set of the other block). The vector may be used to compute refined vectors for each of the blocks. The computations for the different blocks may be shared because the blocks overlap.

Figure 1:
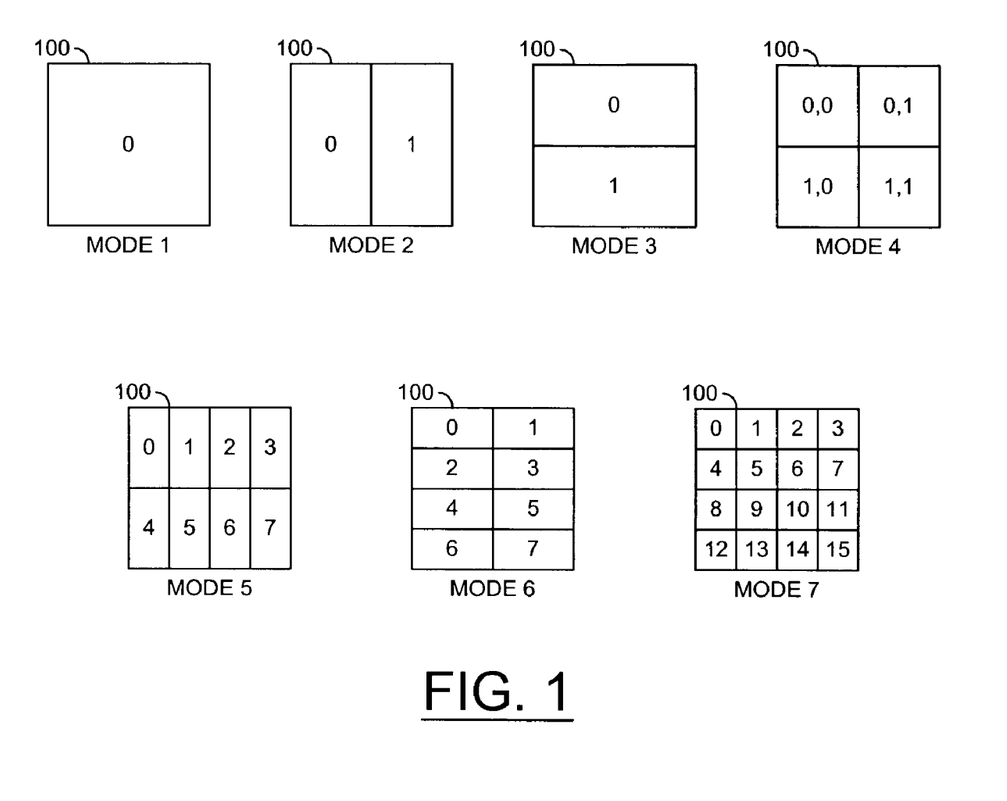
FIG. 1 is a diagram illustrating different block sizes and shapes supported by H.264 for encoding a 16×16 macroblock.

Referring to FIG. 1, a diagram is shown illustrating various block sizes and shapes that may be used to perform motion compensation of a macroblock 100. The macroblock 100 may be a portion of an H.264 compliant bit-stream. See, for example, document JVT-E022d7 entitled "Editor's Proposed Draft Text Modifications for Joint Video Specification (IUT-T Rec. H.264 ISO/IEC 14496-10 AVC), Draft 7" (published 19 Sep. 2002 by the Joint Video Team (JVT) of ISO/IEC MPEG and ITU-T VCEG, Berlin, Germany), which is hereby incorporated by reference in its entirety.

Each 16×16 macroblock 100 may be predicted with a single 16×16 vector (e.g., mode 1). Alternatively, the prediction may be segmented into two 16×8 blocks (e.g., mode 2) in which case two motion vectors may be generated for the macroblock 100. The macroblock 100 may also be segmented into four 8×8 blocks (e.g., mode 4) in which case four motion vectors may be provided for the macroblock. Further sub-divisions of each 8×8 block into 4×8, 8×4 or 4×4 blocks (e.g., modes 5–7) may be performed. To simplify the discussion only modes 1–4 will be addressed. However, the concepts presented may be equally applicable to other modes and/or sub-divisions selected to meet the design criteria of a particular implementation.

An encoder generally decides which mode to use for each macroblock. An error score is generally computed based on the closeness of match for each mode. The modes that use more vectors may be penalized (e.g., have the error score adjusted) for the additional bits that are used to encode the motion vectors. In one example, a number may be added to the error score for each mode that is proportional to the number of vectors used by the mode. In another example, a number may be added to the error score for each mode that is proportional to the number bits that would be used to encode the motion vectors for that mode. The present invention generally provides a solution for efficiently determining "best" motion vectors for whichever mode the encoder selects. As used herein the term "best" means the vector(s) that the encoder determines generally give the best tradeoff between the number of bits used to encode the macroblock and the perceived quality of the macroblock as reconstructed by the decoder, subject to the constraint that the encoder uses only a limited amount of resources to select the vector. In one example, for each vector considered, the encoder generally chooses the vector that gives the smallest sum-of-absolute-differences (SAD) between, for example, the luma signal to be encoded and the reference pixels. In another example, the vector that minimizes a weighted sum between the SAD score and a one-norm of the difference between the motion vector predictor and the motion vector may be chosen.

The amount of computation in determining the error scores may be reduced by combining motion match scores for smaller blocks to obtain scores for larger blocks. The process of combining scores for smaller blocks to obtain scores for larger blocks may be referred to as computational splits. In one example, all vectors may be searched in the range Y [−31, 31] (e.g., a vertical index) and X [−31, 31] (e.g., a horizontal index). For each vector Y, X (each ranging from −31 to 31), a score may be computed for each 8 ×8 block (e.g., blocks 0,0, 0,1, 1,0 and 1,1). The scores are generally computed, for example, as a sum of absolute differences (SAD) between the 8×8 block and a reference block in a different frame offset Y, X from the co-located 8×8 block. Each score computed for an 8×8 block and a single vector Y, X generally involves computing 64 differences, 64 absolute values, and 63 sums when the SAD measure is used.

To compute the scores for the other modes, the 8×8 scores may be added together as summarized in the following TABLE 1:

TABLE 1

| To obtain score for: | Add scores: |
|---|---|
| Score8 × 16_0(X, Y) | Score8 × 8_0,0(X, Y) + Score8 × 8_0,1(X, Y) |
| Score8 × 16_1(X, Y) | Score8 × 8_1,0(X, Y) + Score8 × 8_1,1(X, Y) |
| Score16 × 8_0 (X, Y) | Score8 × 8_0,0(X, Y) + Score8 × 8_1,0(X, Y) |
| Score16 × 8_1(X, Y) | Score8 × 8_0,1(X, Y) + Score8 × 8_1,1(X, Y) |
| Score16 × 16(X, Y) | Score16 × 8_0(X, Y) + Score16 × 8_1(X, Y) |

Alternatively, the 16×16 score may be computed from the 8×16 scores or directly by adding the four 8×8 scores. The use of computational splits generally reduces the amount of computation for each larger score (e.g., 8×16, 16×8, or 16×16 scores) to one addition operation instead of, for example, (i) 128 differences, 128 absolute values, and 127 additions for the 8×16 and 16×8 scores and (ii) 256 differences, 256 absolute values, and 255 additions for the 16×16 score.

Although the use of computational splits generally reduces the amount of computation for obtaining error scores for larger blocks, the use of computational splits in computing the scores for larger regions from the scores for smaller regions is generally exact (e.g., the score values are the same whether computed directly or with the faster method of computational splits). After the scores are computed, the vector for each mode with the minimum score may be chosen.

A hierarchical search may provide for computing the best match for a single block size with fewer computations than a full search. However, the result of a hierarchical search may not be exact (e.g., the chosen vector may differ) and may be inferior. Nonetheless, the savings obtained from a hierarchical search is generally great enough to justify use of the hierarchical search.

In one example, matches may be desired for each 16×16 block in a current image with respect to a reference image. The desired search range may be +/−64 in both directions. Thus, scores for 129*129=16641 possible vectors may be computed. With the conventional full search method, each vector may need 256 SADs, or 4,260,096 SADs for each 16×16 current block. For a simple 2-level hierarchical search in accordance with the present invention, the current frame and reference frame may be decimated by a factor of 2:1 in each direction. Each 8×8 block may be searched in the decimated current frame (e.g., corresponding to a 16×16 block in the un-decimated image) and compared to 8×8 blocks in the decimated reference frame. A search range of +/−32 (e.g., corresponding to +/−64 in the un-decimated frame) may be used. The comparisons generally involve searching 4225 vectors. Each search may use 64 SADS, for a total of 270,400 SADs. The result of the decimated search may be used to perform a search at an integer pixel level (e.g., a +/−3×+/−3 search), which may take 7*7*256=12,544 SADs. The total number of SADs used may be 282,944, or only 6.64% of the number of SADs used in a full-search.

The following example may illustrate how the integer pixel search may be performed after the decimated search. The result of the decimated search (e.g., a best vector) may be, in one example, (−13, 7) (e.g., −13 vertical, 7 horizontal). The center of a new search may be set at (−26, 14) (e.g., converting the best vector to integer-pixel units). Because a search of size +/−3×+/−3 is generally performed, all vectors with vertical components in the interval [−29, −23] and horizontal components in the interval [11, 17] may be searched and the best vector may be chosen. Because many compression formats may allow for sub-pixel accuracy (e.g., half-pixel, quarter-pixel, eighth-pixel), the results of a hierarchical search or a full search may be refined at the sub-pixel level to obtain the vectors.

The present invention may focus on performing computational splits at the end of a hierarchical search. These computational splits may be performed, in one example, at the integer level. First, a decimated search may be performed to obtain one result for the entire 16×16 block. The search may be the same decimated search previously described (e.g., an 8×8 current decimated block compared to 8×8 blocks in the decimated reference frame). Then, the single vector obtained may be used as a basis for a search at the integer level for all block sizes. Because all of the searches may have the same starting vector, computational splits may be used.

In the above example, all blocks (e.g., 8×8, 8×16, 16×8, and 16×16) at the integer-level may be searched for all vectors with vertical components in the interval [−29, −23] and horizontal components in the interval [11, 17]. The best vector may be chosen. However, the scores for the different block sizes are generally not computed independently. In one example, only the 8×8 scores may be computed and the rest of the scores determined using computational splits as illustrated in TABLE 1 above. A sub-pel (e.g., half-pixel, quarter-pixel, eighth-pixel, etc.) refinement may be performed independently on the result of the searches.

Figure 2:
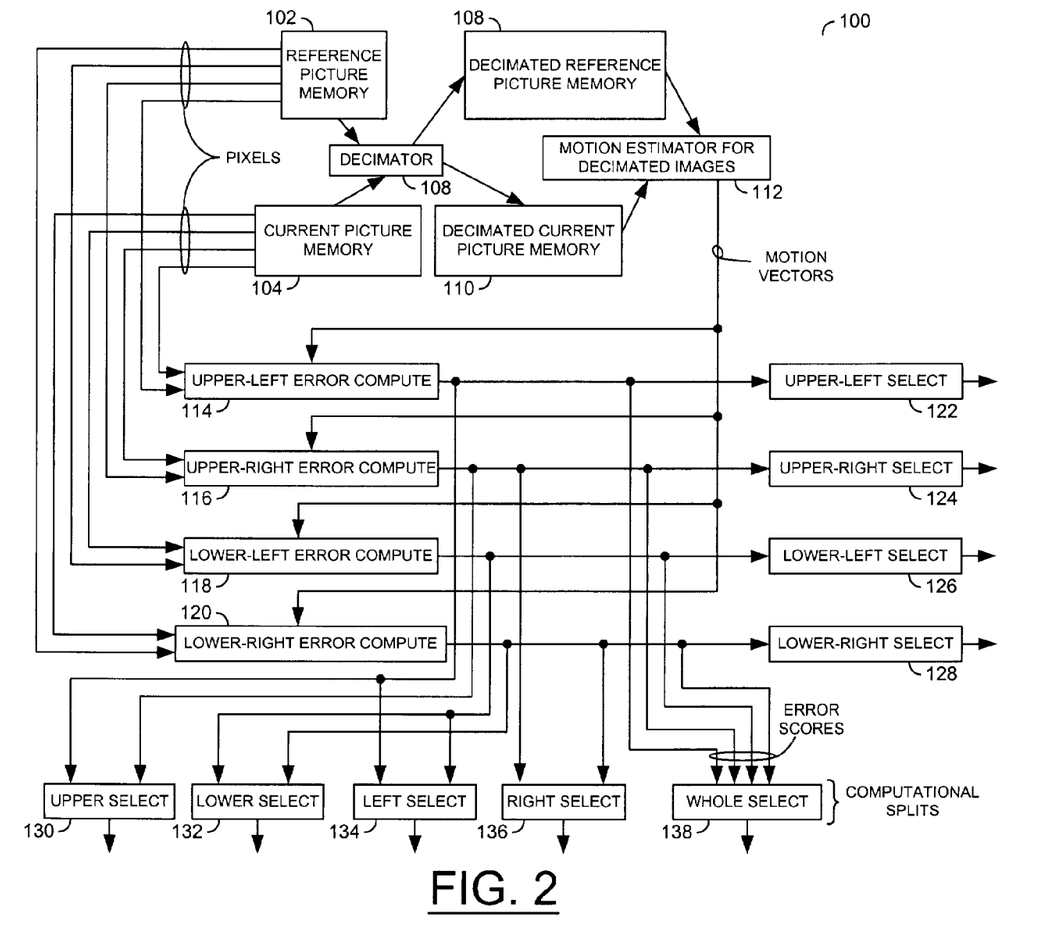
FIG. 2 is a block diagram illustrating a preferred embodiment of the present invention.

Referring to FIG. 2, a block diagram of a system 100 is shown illustrating a preferred embodiment of the present invention. The system 100 may comprise a memory 102, a memory 104, a block (or circuit) 106, a memory 108, a memory 110, a block (or circuit) 112, a number of error computing blocks (or circuits) 114–120 and a number of select blocks (or circuits) 122–138. In one example, the memory 102 may be configured to hold a reference picture. The memory 104 may be configured to hold a current picture. The circuit 106 may be implemented as a decimator circuit.

In one example, the circuit 106 may be configured to decimate the reference picture in the memory 102. The decimated reference picture may be stored in the memory 108. The decimator 106 may be further configured to decimate the current picture in the memory 104. The decimated current picture may be stored in the memory 110. The circuit 106 may be configured to decimate the pictures horizontally, vertically and with a number of ratios (e.g., 4:1, 2:1, etc.).

The block 112 may be implemented as a motion estimator block (or circuit) for the decimated images. The block 112 may be configured to perform motion estimation on the decimated reference picture in the memory 108 and the decimated current picture in the memory 110. The block 112 may be configured to generate a number of motion vectors in response to the motion estimation performed on the decimated images.

The motion vectors may be presented to the blocks 114–120. The blocks 114–120 may be configured to receive respective portions of the reference picture (e.g., as pixels) from the memory 102 and the current picture from the memory 104. The blocks 114–120 may be configured to generate a number of error scores (e.g., sum of absolute differences or SADs) in response to the motion vectors received from the block 112 and the pixels received from the memories 102 and 104. The error scores may be presented to inputs of the select blocks 122–138.

For example, the block 114 may be configured to generate an error score for an upper left region of the macroblock. The error score for the upper left region may be presented to an input of the block 122, an input of the block 130, an input of the block 134 and an input of the block 138. The block 116 may be configured to generate an error score for an upper right region of a block of the current picture. The error score for the upper right region may be presented to an input of the block 124, the block 130, the block 136 and the block 138. The block 118 may be configured to generate an error score for a lower left region of a macroblock of the current picture. The error score from the lower left region may be presented to an input of the block 126, an input of the block 132, an input of the block 134 and an input of the block 138. The block 120 may be configured to generate an error score for a lower right region of a macroblock. The error score for the lower right region may be presented to an input of the block 128, an input of the block 132, an input of the block 136 and an input of the block 138.

The blocks 122–138 may be configured to compare the error scores received from the blocks 114–120. Each of the blocks 122–138 may be configured to generate a respective select signal in response to the error scores received from the blocks 114–120. For example, the block 122 may be configured to generate a select signal in response to the error score for the upper left region. The block 124 is generally configured to generate a select signal in response to the error score for the upper right region. The block 126 is generally configured to generate a select signal in response to the error score for the lower left region. The block 128 is generally configured to generate a select signal in response to the error score for the lower right region.

The blocks 130–138 are generally configured to generate the respective select signals using computational splits. The block 130 is generally configured to generate a select signal based on the error scores for an upper portion (e.g., the upper right and upper left regions) of a macroblock. The block 132 may be configured to generate a select signal based on the error scores of a lower portion (e.g., the lower right and lower left regions) of the macroblock. The block 134 generally presents a select signal in response to a left portion (e.g., upper left and lower left regions) of the error scores from a macroblock. The block 136 generally presents a select signal based on the error scores for a right portion (e.g., upper right and lower right regions) of the macroblock. The block 138 is generally configured to generate a select signal in response to the error scores for the whole macroblock (e.g., all four of the regions). However, other combinations of error scores may be implemented to meet the design criteria of a particular implementation.

Figure 3:
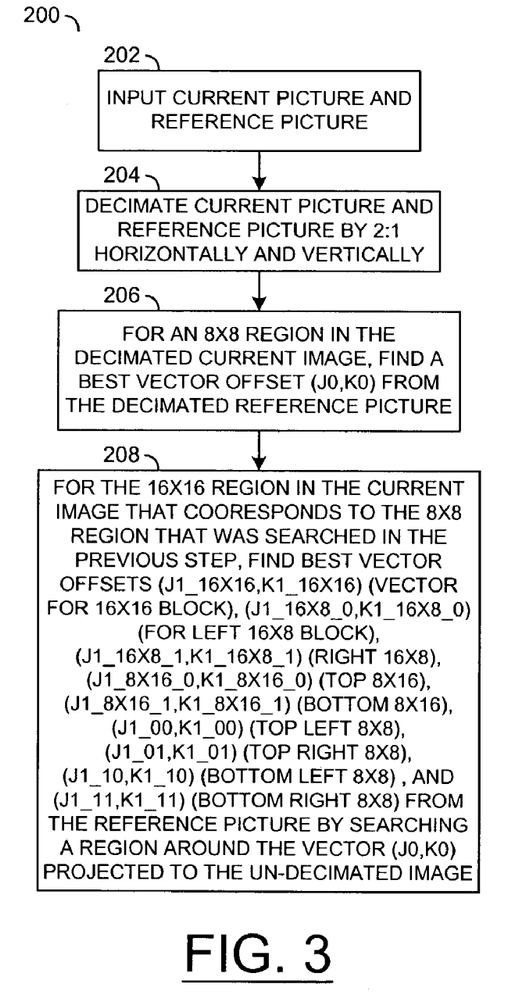
FIG. 3 is a flow diagram illustrating an example process for finding motion vectors in accordance with a preferred embodiment of the present invention.

Referring to FIG. 3, a flow diagram 200 illustrating an example operation of the present invention is shown. In general, the process 200 begins by inputting a current picture and a reference picture (e.g., the block 202). The current picture and the reference picture may be decimated by, in one example, a ratio of 2:1 horizontally and vertically (e.g., the block 204). A best vector offset (e.g., J0, K0) from the decimated reference picture is generally determined for a predetermined size region (e.g., 8×8) in the decimated current picture (e.g., the block 206).

For example, an error score may be determined by calculating a sum of absolute differences between a current 8×8 block and an 8×8 block in a decimated reference picture offset J rows and K columns from a location of the current block in the current picture. If the error score is smaller than the present value of the best vector, the error score generally replaces the best vector score and the index for the vector J0 is set to the current J and the index for the best vector K0 is set to the current K. The sum of absolute differences are generally calculated for all of the possible positions J,K.

The results of the step 206 are generally applied to find best vector offsets (e.g., vectors for the 16×16 block, the left 16×18 block, the right 16×8 block, the top 8×16 block, the bottom 8×16 block, the top left 8×8 block, the top right 8×8 block, the bottom left 8×8 block and the bottom right 8×8 block) from the reference picture for the 16×16 region in the current image that corresponds to the 8×8 region that was searched in the step 206. The vector offsets are generally determined by searching a region around the vector generated in the step 206 projected to the undecimated image (e.g., the block 208).

For example, error scores may be calculated for the 8×8 blocks which make up the 16×16 region. In one example, error scores comprising sum of absolute differences (SADs) may be calculated for the upper left 8×8 block, the upper right 8×8 block, the lower left 8×8 block and the lower right 8×8 block corresponding to the region offset of J rows and K columns with respect to the reference picture. Error scores for the 8×16, 16×8 and 16×16 regions may be computed by adding the error scores generated for corresponding 8×8 regions. For example, a score for a top 8×16 region may be computed by adding the scores for the upper right and upper left 8×8 regions. The scores for the other regions may be obtained similarly. A best score and a best vector may be maintained for each of the regions in the 16×16 region. The current best scores may be compared with the current computed scores. If the current computed scores are smaller than the currently stored best scores, the best scores are generally updated to the current computed scores and the vectors for the respective best score is generally updated to the present J and K. The process is generally repeated for each J and K in the 16×16 region. The process 200 is generally repeated for each of the 16×16 (or other desired size) regions making up the current image.

Figure 4:
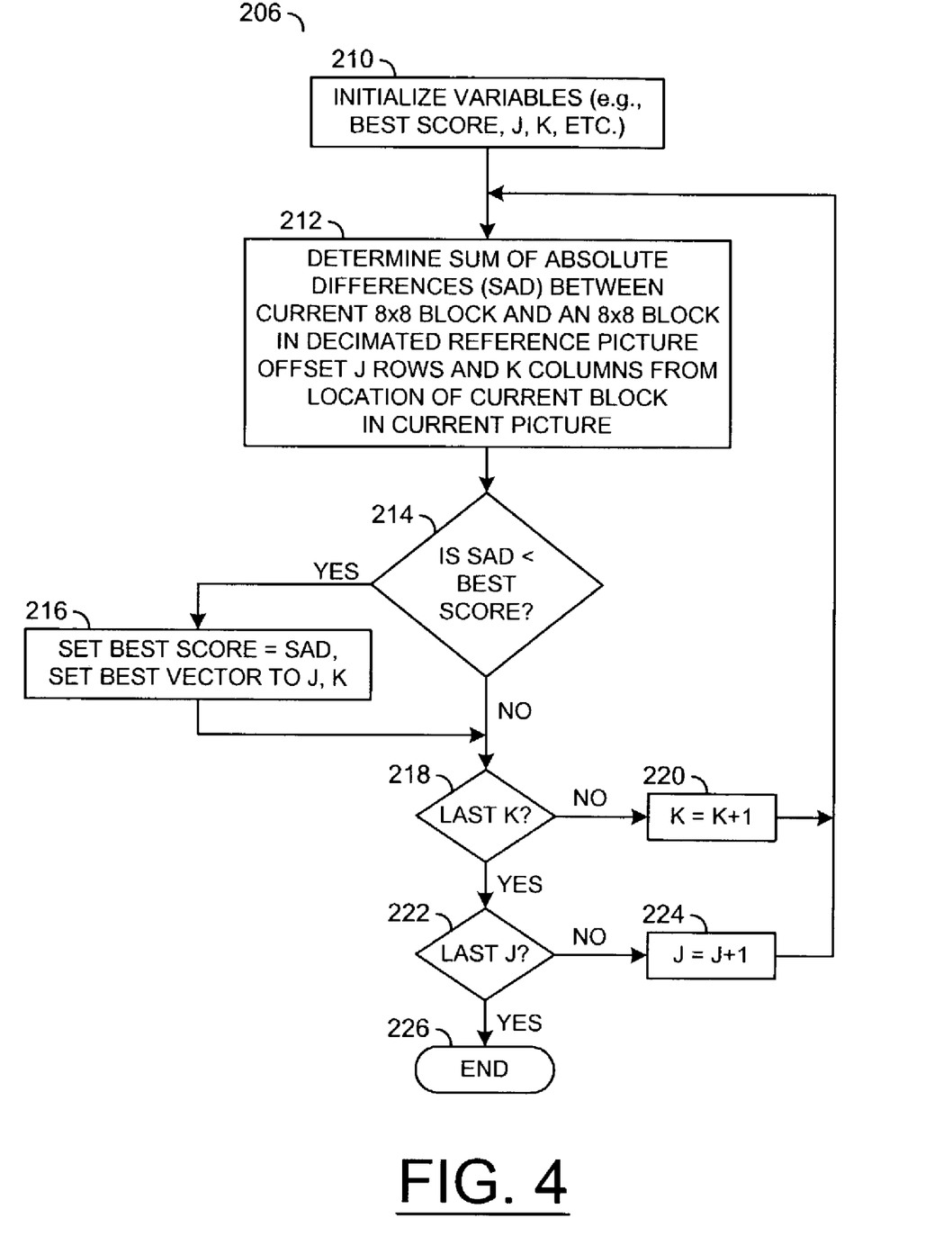
FIG. 4 is a flow diagram illustrating a more detailed example process of step 206 in FIG. 3.

Referring to FIG. 4, a flow diagram is shown illustrating a more detailed process for the step 206 of FIG. 3. In one example, the process 206 may begin by initializing a number of variables (e.g., the block 210). The variables may include, in one example, a best score variable (e.g., BEST) and a vector (e.g., J,K), where J and K are integers. The values J and K may be used as indices for an iterative process for determining a best vector offset. The values J and K may be varied through a predetermined range. In one example, J and K may vary from a value of negative 31 to a value of positive 31 (e.g., for a 16×16 macroblock decimated 2:1 both vertically and horizontally).

The sum of absolute differences (SAD) between the current 8×8 block in the current decimated picture and an 8×8 block in a decimated reference picture may be determined for each value of J and K. The 8×8 block in the decimated reference picture is generally offset, by a number of rows determined by the value of J and a number of columns determined by the value of K, from the location of the current 8×8 block in the current decimated picture (e.g., the block 212). The sum of absolute differences (or error score) may be compared, in one example, to the value contained in the best score variable BEST (e.g., the block 214). When the sum of differences is smaller than the value of BEST, the value of BEST is generally reset to the value of the sum of differences and the coordinates for the best vector offset (e.g., J0, K0) are set to the current J and K values (e.g., the block 216).

The value of the variable K may be increment until all of the range for K has been checked for each value of J (e.g., the blocks 218 and 220). Similarly, the variable J may be incremented until all of the values in the range for J have been checked (e.g., the blocks 222 and 224). When the entire ranges of J and K have been checked, the process 206 generally ends (e.g., the block 226) and the determined best score (e.g., BEST) and best vector offset (e.g., J0, K0) are generally presented to a next stage.

Figure 5:
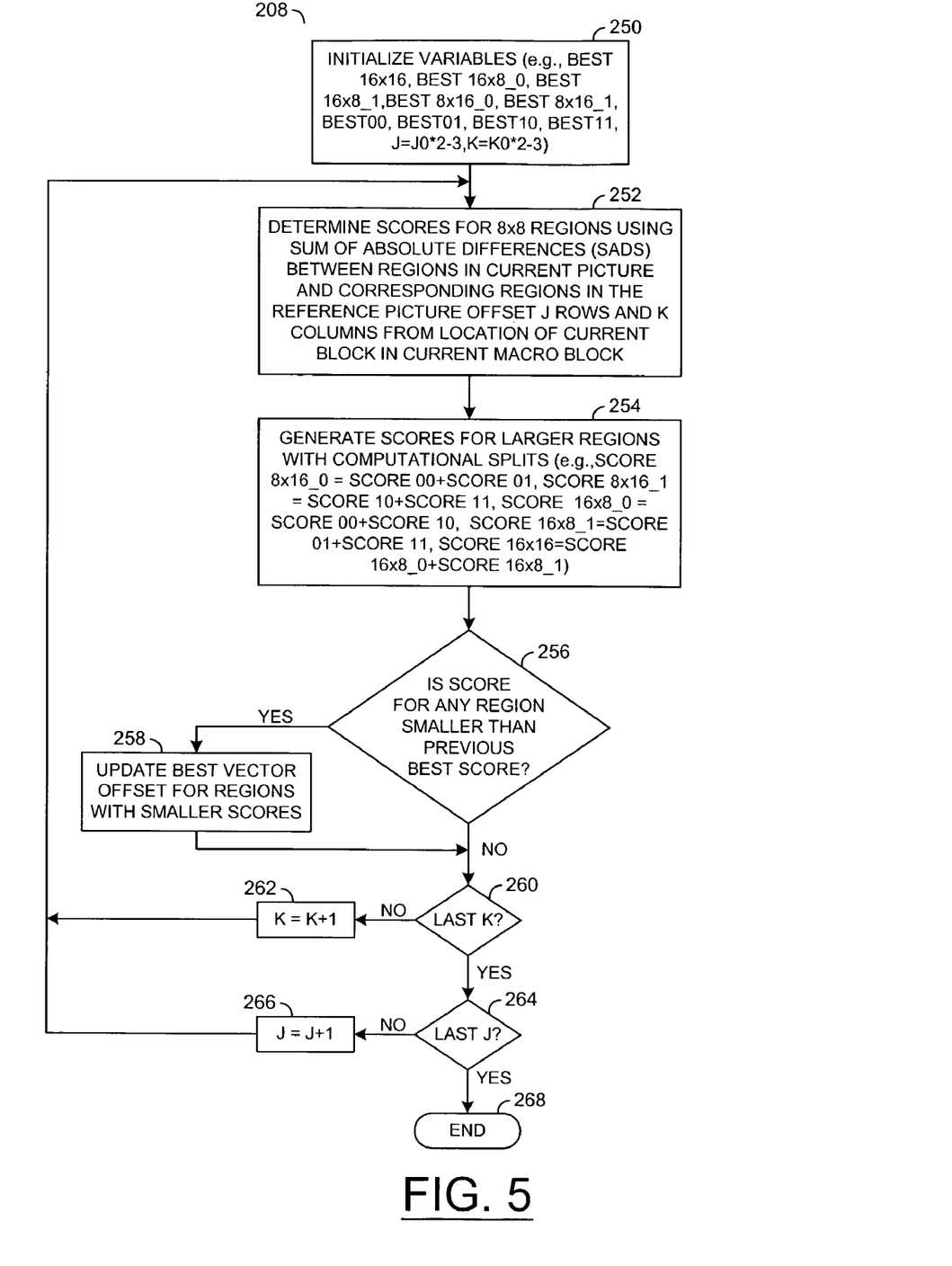
FIG. 5 is a flow diagram illustrating a more detailed example process for the step 208 of FIG. 3.

Referring to FIG. 5, a flow diagram is shown illustrating a more detailed process for the step 208 of FIG. 3. The step 208 generally begins by initializing a number of variables. The variables may comprise a vector (e.g., J, K, where J and K are integers) and a number of best scores for a number of regions (e.g., BEST16×16, BEST16×8_0, BEST16×8_1, BEST8×16_0, BEST8×16_1, BEST00, BEST01, BEST10, BEST11, etc.). The best scores may be initialized to a predetermined value that is generally larger than any error score expected. The variables J and K may have ranges, in one example, of JO*2−3 to JO*2+3 and KO*2−3 to KO*2+3, respectively, where JO, KO is the best vector offset determined in step 206 (e.g., the block 250).

Error scores (e.g., score00, score01, score10 and score11) are generally determined for, in one example, the 8×8 regions making up the 16×16 region in the current image that corresponds to the 8×8 region that was searched in the previous step. The error scores are generally determined by using the sum of absolute differences between regions in the current 16×16 region (or macroblock) and corresponding regions in the reference picture offset by a number of rows determined by the value of J and a number of columns determined by the value of K from the location of the current block in the current macroblock (e.g., the block 252).

The scores determined in the step 252 may be combined to generate scores for larger regions using computational splits (e.g., the block 254). For example: the score for a region 8×16_0 may be generated by adding the scores for the region 0,0 and the region 0,1 (e.g., score8×16_0=score00+score01); the score for a region 8×16_1 may be generated by adding the scores for the region 1,0 and the region 1,1 (e.g., score8×16_1=score10+score11); the score for a region 16×8_0 may be generated by adding the scores for the region 0,0 and the region 1,0 (e.g., score16×8_0=score00 +score11); the score for a region 16×8_1 may be generated by adding the scores for the region 0,1 and the region 1,1 (e.g., score16×8_1=score01+score11); the score for the whole 16×16 region may be generated by adding, for example, the scores for the regions 16×9_0 and 16×8_1 (e.g., score16×16=score 16×8_0+score16×8_1). However, other combinations of the scores for the smaller regions may be used to generate the score for the whole region (e.g., score16×16=score00+score01+score 10+score 11, etc.).

The scores determined in step 252 and the scores generated in step 254 are generally checked against the current values of the variables for the current best scores (e.g.; the block 256). If any of the determined or generated scores are smaller than the current best scores, the particular best scores are updated and the corresponding best vector offsets are updated with the current values for J and K. For example: when score00 is less than BEST00, BEST00 is generally set equal to score00, J1_00 is set equal to J and K1_00 is set equal to K; when score01 is less than BEST00, BEST00 is generally set equal to score01, J1_01 is set equal to J and K1_01 is set equal to K; when score10 is less than BEST10, BEST10 is generally set equal to score10, J1_10 is set equal to J and K1_10 is set equal to K; when score11 is less than BEST11, BEST11 is generally set equal to score00, J1_11 is set equal to J and K1_11 is set equal to K; when score8×16_0 is less than BEST8×16_0, BEST8×16_0 is generally set equal to score8×16_0, J1_8×16_0 is set equal to J and K1_8×16_0 is set equal to K; when score8×16_1 is less than BEST8×16_1, BEST8×16_1 is generally set equal to score8×16_1, J1_8×16_1 is set equal to J and K1_8×16_1 is set equal to K; when score16×8_0 is less than BEST16×8_0, BEST16×8_0 is generally set equal to score16×8_0, J1_16×8_0 is set equal to J and K1_16×8_0 is set equal to K; when score16×8_1 is less than BEST16×8_1, BEST16×8_1 is generally set equal to score16×8_1, J1_16×8_1 is set equal to J and K1_16×8_1 is set equal to K; when score16×16 is less than BEST16×16, BEST16×16 is generally set equal to score16×16, J1_16×16 is set equal to J and K1_16×16 is set equal to K.

Once the best scores and vector offsets have been updated, the values for J and K are generally incremented. The value of the variable K is generally incremented through the predetermined range for each value of J (e.g., the blocks 260 and 262). The value of the variable J is generally incremented through the predetermined range until the entire region has been searched (e.g., the block 264 and 266). When the entire region has been searched, the process 208 generally ends and the best values and the respective best vector offsets may be presented (e.g., the block 268)

Figure 6:
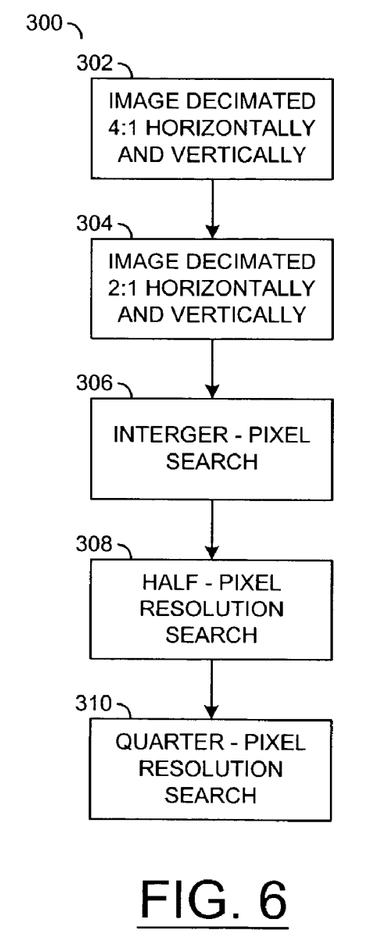
FIG. 6 is a flow diagram illustrating a multi-stage search.

Referring to FIG. 6, a flow diagram 300 of a multi-stage search in accordance with the present invention is shown. In a multi-stage (or level) search, the computational splits may be used at any level. In one example, a multi-stage (e.g., five stages) search may comprise the steps of: (i) decimating an image with a ratio of 4:1 in each direction (e.g., the block 302), (ii) decimating the image with a ratio of 2:1 in each direction (e.g., the block 304), (iii) performing an integer-pixel search (e.g., the block 306), (iv) performing a half-pixel resolution search (e.g., the block 308), and/or (v) performing a quarter-pixel resolution search (e.g., the block 310).

In one example, a full search may be performed at level 1. At each successive level, the results of the previous level may be used. At one of the successive levels (e.g., level 2, 3, 4, or 5) computational splits are generally used. Once a computational split is used, there is generally a different starting (center) vector for all block sizes. Computational splits may be used when the same vectors are considered for all block sizes. For a hierarchical search in accordance with the present invention, the same vectors are generally considered for all block sizes when the result from a previous (e.g., more coarse) level is "split" to be used for different block sizes. The center vector at the stage where computational splits are used is generally the same for all block sizes. For full search, this is generally true in the trivial sense, since all searches are centered on 0,0. At the levels after the computational splits are applied, an independent search (e.g., no computational splits) is generally performed.

In one example, 4×4 blocks may be searched at level 1 (e.g., corresponding to 16×16 blocks at integer level) and computational splits may be used at level 2 (e.g., 4×4, 4×8, 8×4 and 8×8 searches using joint score computation, corresponding to 8×8, 8×16, 16×8 and 16×16 at the integer level). At levels 3–5, the vectors may be refined independently. An example of the use of computational splits at level 3 was described above in connection with FIG. 3.

If computational splits are used at level 4, a block of size 16×16 is generally used at level 3. The results may be used for half-pixel searches for all of the block sizes that use computational splits. However, for the quarter-pixel searches, all block sizes may be searched independently. When performing computational splits is deferred until level 5, all of the searches are generally performed on 16×16 blocks until level 5, where computational splits may be used. More sophisticated hierarchical searches may be implemented accordingly to meet the design criteria of a particular implementation. Examples of such hierarchical searches may be found in U.S. Pat. Nos. 5,801,778 and 6,108,139; which are hereby incorporated by reference in their entirety.

Full macroblock computational splits may be performed. Computational splits may be extended to include block sizes down to 4×4. For example, a single command may be implemented such that all blocks may be searched (e.g., 4×4, 4×8, 8×4, 8×8, 8×16, 16×8, and 16×16) in a macroblock, using no extra SADs. In one example, SADs may be reused to compute, for example, 39 distinct results. Also, the 8×8 SAD computations may be broken into 4×4 SAD computations. 8×8 block computational splits may be performed. The result of the 8×8 searches may be used as the basis for 4×8, 8×4 and 4×4 vectors. These vectors may be computed with computational splits. At the same time, a new 8×8 vector may be obtained with an increased search range relative to the other 8×8 vectors in the same macroblock. This may be accomplished by splitting the 8×8 SAD into four 4×4 SADs. The score logic for computing 8×8, 4×8, 8×4 and 4×4 may be implemented similarly to the logic for computing 16×16, 8×16, 16×8 and 8×8 using computational splits.

In one example where computational splits are used at the quarter-pixel level, a full-pixel search may be performed to obtain results for 16×16 blocks. Computational splits may be used to get 16×16, 16×8, 8×16 and 8×8 results at the quarter-pixel level. A second quarter-pixel search may be done to get 8×8, 8×4, 4×8 and 4×4 results.

The functions performed by the flow diagrams of FIGS. 3–6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art (s).

The present invention may also be implemented by the preparation of optimized integrated circuits, ASICS, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

The various signals of the present invention are generally shown on individual inputs and outputs. In other embodiments, some or all of the various signals may be multiplexed through one or more inputs and/or outputs as desired or needed. The various signals of the present invention may be implemented as single-bit or multi-bit signals in a serial and/or parallel configuration.

While the invention has been particularly shown and described with reference to the preferred embodiments thereof, it will be understood by those skilled in the art that various changes in form and details may be made without departing from the spirit and scope of the invention.

The invention claimed is:

1. A method for performing motion estimation, comprising the steps of:
   (A) determining one or more first vectors representative of a displacement of a first block of a first image in a second image;
   (B) determining one or more second vectors representative of a displacement of said first block in said second image and a first sub-block and a second sub-block of said first block based upon (i) said one or more first vectors, (ii) a plurality of error scores and (iii) one or more combinations of said error scores; and
   (c) performing motion estimation using said one or more second vectors.

2. The method according to claim 1, wherein step (A) comprises performing a hierarchical search.

3. The method according to claim 1, wherein step (B) comprises generating one or more computational splits.

4. The method according to claim 1, wherein said plurality of error scores comprises:
   a first closeness of match score for at least one displacement vector for said first sub-block of said first block; and
   a second closeness of match score for at least one displacement vector for said second sub-block of said first block.

5. The method according to claim 1, wherein said plurality of error scores comprises:
   a plurality of closeness of match scores for a plurality of displacement vectors for a plurality of sub-blocks of said first block.

6. The method according to claim 1, wherein said combination of error scores determines a closeness of match score for said first block.

7. The method according to claim 1, wherein said combination comprises an addition of said error scores.

8. The method according to claim 1, further comprising the step of:
  decimating said first and second images into a first decimated image and a second decimated image, respectively.

9. The method according to claim 8, wherein said first and second images are decimated horizontally, vertically or both horizontally and vertically.

10. The method according to claim 8, wherein said one or more first vectors are determined based on said first and second decimated images.

11. An apparatus comprising:
  a first circuit configured to generate one or more motion vectors in response to a first image and a second image;
  a second circuit configured to generate a plurality of error scores in response to said first image, said second image and said one or more motion vectors; and
  a third circuit configured to generate (i) a plurality of first select signals, each in response to one of said plurality of error scores and (ii) one or more second select signals, wherein said one or more second select signals are each generated in response to two or more of said plurality of error scores.

12. The apparatus according to claim 11, wherein said first circuit comprises:
  a memory configured to store said first and second images and a first decimated image and a second decimated image; and
  a decimator configured to generate said first and second decimated images in response to said first and second images, respectively.

13. The apparatus according to claim 12, wherein said one or more motion vectors are generated using said first and second decimated images.

14. The apparatus according to claim 11, wherein said one or more motion vectors are representative of a displacement of a first block of said first image in said second image.

15. The apparatus according to claim 14, wherein said plurality of error scores comprises:
  a first closeness of match score for at least one displacement vector for a first sub-block of said first block; and
  a second closeness of match score for at least one displacement vector for a second sub-block of said first block.

16. The apparatus according to claim 14, wherein said plurality of error scores comprises a plurality of closeness of match scores for a plurality of displacement vectors for a plurality of sub-blocks of said first block.

17. The apparatus according to claim 11, wherein each of said plurality of error scores comprises a sum of absolute differences between a first block of said first image and a second block of said second image.

18. The apparatus according to claim 12, wherein said decimator is configured to decimate said first and second images horizontally, vertically, or both horizontally and vertically.

19. The apparatus according to claim 11, wherein:
  said first circuit is configured to perform a hierarchical search of said first and second images; and
  said third circuit is configured to generate said select signals in response to one or more computational splits.

20. An apparatus comprising:
  means for generating one or more motion vectors in response to a first and a second image;
  means for generating a plurality of error scores in response to said first image, said second image and said one or more motion vectors; and
  means for generating (i) a plurality of first select signals, each in response to one of said plurality of error scores and (ii) one or more second select signals, wherein each of said one or more second select signals is generated in response to two or more of said plurality of error scores.

21. The method according to claim 1, wherein the step of determining the one or more second vectors comprises the steps of:
  generating said plurality of error scores in response to said first image, said second image and said one or more first vectors;
  generating a plurality of first select signals, each in response to one of said plurality of error scores; and
  generating one or more second select signals, each in response to two or more of said plurality of error scores.

22. The method according to claim 21, wherein said one or more second vectors are determined based upon said plurality of first select signals and said one or more second select signals.

* * * * *